3,759,825
METHOD OF PREPARING A CALCINED COPPER-IRON SUPPORTED CATALYST AND PROCESS UTILIZING THE CATALYST

Sun W. Chun, Murrysville, Harry A. Hamilton, Natrona Heights, and Angelo A. Montagna, Monroeville, Pa., assignors to Gulf Research & Development Company, Pittsburgh, Pa.
No Drawing. Filed July 15, 1971, Ser. No. 163,055
The portion of the term of the patent subsequent to June 26, 1990, has been disclaimed
Int. Cl. B01j 11/24; C10g 27/04
U.S. Cl. 208—191                                    10 Claims

ABSTRACT OF THE DISCLOSURE

A copper-iron group metal catalyst useful for the conversion of thiols to disulfides is prepared by co-impregnating a support with a solution of a copper salt and an iron group metal salt by the method of minimum excess solution.

---

This invention relates to a method of preparing a catalyst comprising an iron group metal and copper for use in a sweetening process.

BACKGROUND OF THE INVENTION

Thiols (mercaptans) are sulfur analogues of alcohols and contain an —SH (sulfhydril) group. Many petroleum fractions contain alkanethiols as minor constituents and these thiols impart to such fractions and their distillates an objectionable odor, corrosiveness and instability. Distillates containing such objectionable sulfur derivatives are known as "sour" distillates, and processes for oxidizing the thiols or sulfhydril containing compounds to less objectionable disulfides are known as sweetening processes. The sweetening process is believed to be an oxidative coupling of two mercaptan molecules to give a disulfide, and thus the processes are normally run in the presence of a gas containing free molecular oxygen.

One of the most widely used catalysts for sweetening of sour petroleum fractions is copper chloride either in solution or on various supports. The use of sodium plumbite and caustic are also known. More recently, a patent to Norman L. Carr et al., U.S. Pat. 3,491,020 suggests the use of a catalyst composite comprising an inorganic amorphous polymer of iron, silicon and oxygen for the selective oxidation of mercaptans to disulfides. All of the above processes suffer, however, from low throughput life before the catalyst is required to be regenerated.

The method comprises co-depositing copper and an iron group metal salt from solution onto an inorganic oxide support. The atomic ratio of copper to iron in the depositing solution should be from 0.01:1 to 1:1. The final catalyst should have from 0.5 to 40 weight percent of said copper salt and from 5 to 50 weight percent of said iron group metal salt. After the metals are co-deposited, the catalyst is dried and thereafter calcined.

The support used to prepare the catalyst of this invention can be any support having a reasonably high surface area of 50 m.²/g. or more, usually a surface area of 100 to 800 m.²/g. The support is usually an inorganic oxide type support which is well known in the art. Preferred among the inorganic oxide supports are those containing alumina or silica, although other types of supports such as thoria or zirconia can be used. Mixtures of oxides such as silica-aluminas can also be used. The most preferred support is gamma-alumina.

For the practice of this invention, the salt of the iron group metal employed must be soluble in the solvent used, for example, water, an alcohol such as methyl alcohol, or acetone. Examples of the salts of iron group metals which may be successfully employed in this invention are the nitrates, sulfates, halides, acetates, nitrites, etc., and suitable compounds of cobalt, organometallic nickel and iron.

A list of suitable salts includes, but is not limited to: $FeCl_3$ $Fe(NO_3)_3$; $FeCl_2$; $Fe(NO_3)_2$; $Fe(NO_2)_2$; $FeBr_3$; $Fe(C_2H_3O_2)_3$; $Fe_2(C_2O_4)_3 \cdot 6H_2O$; $FeOCl$; $Fe(SO_4)_3$; $Fe(ClO_4)_3 \cdot 6H_2O$; $NiCl_2$; $NiF_2$; $Ni(NO_3)_2$; $Ni(C_2H_3O_2)_2$; $CoCl_2$; $CoF_2$; and $Co(NO_3)_2$.

The most preferred iron group metal salt for use in the practice of the instant invention is ferric chloride. Ferric chloride is readily soluble in water, is inexpensive, is readily available in quantity, and yields a finished catalytic product of outstanding properties. Although a preferred mode of operation is to use the iron group metals in their higher oxidation states, it is within the contemplation of this invention to employ a suitable salt of an iron group metal in its lower oxidation state, form the deposit on the high area support and then oxidize the metal ion to its higher oxidation state.

Similarly, the copper salt employed must be soluble in the solvent used, for example, water or an alcohol such as methyl alcohol, or acetone. Examples of copper salts which may be successfully employed in this invention are the halides, nitrates, sulfates, acetates and oxalates, i.e., copper chloride copper nitrate; copper sulfate; copper acetate; copper oxalate; copper bromide; copper iodide; copper tetraamine nitrate; copper perchlorate and copper fluoride. Copper chloride ($CuCl_2$) is the most preferred salt.

The iron group metal salt and the copper salt are admixed together to form a coimpregnating solution. The atomic ratio of copper to iron in the coimpregnating solution should be such that the resulting catalyst has an atomic ratio of copper to iron of from 0.01:1 to 1:1 and is preferably from 0.1:1 to 0.7:1. It is preferred that the amount of impregnating solution be such as to bring the support to the point of incipient wetness. This method is preferred since it is easier to control the atomic ratio of the copper to iron in the finished catalyst using this technique. Vacuum coimpregnation techniques can also be employed or puddling techniques can also be employed or co-deposition of copper and iron from excess solution onto the support so long as the finished catalyst has an atomic ratio of copper to iron within the ranges set forth above.

The amount of copper salt in the impregnating solution should be such to deposit from 0.5 to 40, preferably 1 to 25 weight percent copper salt on the final catalyst. The amount of the iron group metal salt in the impregnating solution should be such as to deposit from 5 to 50, preferably from 5 to 35 weight percent of the iron salt based on the total weight of the final catalyst. In all cases, the salt concentrations are calculated on the basis the salts are anhydrous, i.e. no water of hydration.

As will be indicated further below, the activity and life of the copper-iron catalysts, at least for the sweetening reaction, is apparently greatly dependent on the method of preparing the catalyst. Thus, while it is not certain as to just what it is which is conferring the catalytic properties, it is known that preparing the copper-iron catalyst by the technique of this invention results in a copper-iron group metal catalyst having a surprisingly higher activity when compared to other methods such as sequential deposition of copper and iron.

The wet composites containing the copper and iron salts are usually dried at temperatures between 200° F. and 300° F. for 16 hours. The catalysts are then usually calcined in the presence of air at temperatures from 400° F. to 800° F. for 16 hours. This calcined operation tends to convert any iron salt to an oxide form. Some of the copper salts tend to remain in the form in which they were deposited, some copper oxide may form, and it is during this operation that at least a portion of the copper chemically combines with the iron to form $CuFe_2O_4$.

The charge stock which can be sweetened using the catalyst of this invention can be any atmospheric petroleum distillate having a boiling point from about 50° F. to 700° F. This boiling range encompasses petroleum fractions such as liquid petroleum gas to heavy distillate fuel oils. Usually sweetening processes are relegated to the lighter boiling charge stocks, such as liquid petroleum gas, gasolines and naphthas. It is one of the advantages of the catalysts of this invention that they are useful for the sweetening of higher boiling petroleum distillates such as heavy distillate fuel oils.

The contact treatment with the catalytic composite described above can be carried out at a temperature as low as 0° F. to 300° F. The preferred temperatures are in the range of from 80° F. to 200° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cycle time of the catalyst and reduces the frequency of reactivation. The oxygen concentration of the feed stock may range, then, from no oxygen in the feed stock, to that naturally present, to that oxygen concentration resulting from complete saturation of the feed stock with air and it may exceed the saturation level for those stocks very high in mercaptan sulfur. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to regenerative treatment for reactivation when it becomes spent.

The catalyst does lose its activity in use, however, possibly as a result of a reduction in lattice oxygen within the catalyst and/or gum formation. For this reason it is advantageous to employ multiple reactors which are alternately on stream. This permits the reactivation of one catalyst bed while the other or others continue to function. Effective activation results from passing air at atmospheric pressure through the catalyst bed at a temperature of about 500° F. for about 40 minutes. The main purpose of reactivation is to remove the gum from the catalyst surface, to replenish the oxygen in the lattice structure of the catalyst and to remove any excess water which may hinder the catalytic activity.

In a general embodiment of this invention, the sour hydrocarbon feed is contacted with air and this distillate-air mixture is heated to the desired process temperature. Usually the distillate or the mixture may be preheated to the reaction temperature or the mixture may be heated in the reaction vessel. Alternatively, the distillate may be optionally preheated and passed downflow or upflow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amount of oxygen is 1.5 times that stoichiometrically required to react with the mercaptan sulfur, but amounts from 0.5 to 20 or more times the stoichiometric quantity are satisfactory.

The distillate and air are passed into the reaction vessel containing the copper and iron coimpregnated catalyst under appropriate conditions of temperature and pressure. The space velocity of the sour distillate is in general dependent upon the thiol content and the properties of the charge stock and the particular temperature chosen. A suitable space velocity is in the range of one to 50 liquid weight hourly space velocity based on the total flow, but the space velocity is usually in the range of from 1 to 10 LVHSV.

The sweetened product together with excess air is passed from the catalyst bed into a suitable condenser which is maintained at a temperature sufficiently low to condense any distillate vapors. The air is separated from the distillate and a non-corrosive and "doctor sweet" product is recovered. The invention will be further described with reference to the following experimental work.

Example 1

A catalyst to contain a nominal amount of 4 percent $CuCl_2$ and 25 percent of $Fe_2O_3$ was prepared as follows:

(1) Calcined 300 cc.'s of Davison Grade 70 silica gel for 16 hours in a muffle furnace. The silica gel after calcination weighed 134 grams. The support had the following characteristics: BET S.A.=320 m.$^2$/g.; Total pore vol.=0.99 cc./g.; Average R.P.=73 A.; and Fe content=0.018%.
(2) Dissolved 148 grams of $FeCl_3 \cdot 6H_2O$ and 9.23 grams of $CuCl_2 \cdot 2H_2O$ in 100 cc.'s of distilled water.
(3) Impregnated this solution on the calcined silica gel by pouring solution over the support with continuous mixing. A minimum excess of solution was employed.
(4) Oven dried the impregnated catalyst at 250° F. for 16 hours then calcined at 600° F. for 16 hours.

The final catalyst contained 1.9 weight percent Cu and 21.5 percent $Fe_2O_3$ and 3.1% chlorine as analyzed by X-ray fluorescence.

A series (Series A) of catalysts was prepared in a manner similar to Example 1 except that they contained along with about 25% $Fe_2O_3$ the following nominal levels of $CuCl_2$: 10% $CuCl_2$, 13% $CuCl_2$ and 16% $CuCl_2$. Another series (Series B) of two samples was prepared in a manner similar to Example 1 except that they contained nominally 7.4% $CuCl_2$ along with 8.6% $Fe_2O_3$ and 13% $CuCl_2$ along with 12% $Fe_2O_3$. Table I lists these samples along with their analyses.

TABLE I.—SERIES A
[Variable $CuCl_2$ content, constant $Fe_2O_3$ content]

| Example No. | Nominal levels (percent) of— | |
|---|---|---|
| | $CuCl_2$ | $Fe_2O_3$ |
| 1 | 4 | 24 |
| 2 | 10 | 22.5 |
| 3 | 13 | 25.0 |
| 4 | 16 | 21.0 |
| Series B | | |
| 5 | 13 | 12 |
| 6 | 7.4 | 8.6 |

A series of runs was made using the catalysts described above in Table I containing 4 through 16 percent $CuCl_2$ by weight. The catalysts were used to sweeten a heavy distillate fuel oil whose properties are given in Table II below.

TABLE II.—HEAVY DISTILLATE FUEL OIL INSPECTION

| Inspections: | Heavy distillate Fuel oil |
|---|---|
| Gravity: ° API | 40.4 |
| Viscosity, SUV, 100° F. | 37.3 |
| Flash, P–M: ° F. | 194 |
| Pour point: ° F. | +15 |
| Color, ASTM D1500 | 0.5 |
| Sulfur, wt. percent | 0.12 |
| Mercaptan sulfur: p.p.m. | 394 |
| Total acid number, ASTM D–974 | 0.01 |
| Aniline point, ° F. | 175 |
| Distillation, ASTM D–86: | |
| Overpoint: ° F. | 428 |
| Endpoint: ° F. | 626 |
| 10% at: ° F. | 500 |
| 50% at: ° F. | 550 |
| 90% at: ° F. | 592 |

The sweetening reaction occurred by passing the heavy distillate together with 65 s.c.f. of air per bbl. upflow at 150° F.; 50 p.s.i.g. and a 9 liquid volume hourly space velocity through a bed of the catalyst. The sweetening activity was determined by testing the product oil at two-hour intervals using the doctor test (ASTM Test D–484) that is sensitive for detecting thiol sulfur concentrations of greater than about three p.p.m. in the product. The results are shown on Table III below, where Examples 7–12 used the catalysts from Examples 1–6, respectively.

TABLE III

[Sweetening of heavy distillate using Cu, Fe, Si, oxygen catalyst]

| Example No. | Percent of— CuCl$_2$ | Percent of— Fe$_2$O$_3$ | Cu/Fe | Volume throughput of sweet product |
|---|---|---|---|---|
| 7 | 4 | 24 | 0.099 | 144 |
| 8 | 10 | 22.5 | 0.264 | 486 |
| 9 | 13 | 25 | 0.309 | 918 |
| 10 | 16 | 21 | 0.452 | 468 |
| 11 | 13 | 12 | 0.643 | 342 |
| 12 | 7.4 | 8.6 | 0.510 | 36 |

Referring to Table III above, it can be seen that the optimum copper content is between 8 and 18 percent calculated as CuCl$_2$ and that iron should be at least 5 percent calculated as Fe$_2$O$_3$.

Example 13

A catalyst was prepared in a manner similar to that of Example 1 above except no copper chloride was employed. This catalyst was then tried for the same sweetening reaction as shown in Table III under the same conditions and no sweet product throughput was obtained.

Example 14

A catalyst similar to Example 1 was prepared except no ferric chloride was employed. The catalyst was tested in the same manner as Example 2 above. The volume throughput of sweet product was 18.

A comparison of Examples 1–14 shows that the method of this invention using coimpregnation of copper and an iron group metal salts results in a catalyst having unusually long life.

The following examples, namely 15 and 16, show that coimpregnation of the Cu and Fe salts yields the best catalyst.

Example 15

The catalyst of Example 14 (containing 4% CuCl$_2$ on silica) was then impregnated by the incipient wetness technique with an aqueous solution of ferric chloride to deposit the equivalent of 25% Fe$_2$O$_3$ after drying and calcining as in Example 1. This catalyst was tested for the same reaction as shown in Table III under the same conditions and a volume throughput of sweet product of 90 was obtained.

Example 16

The catalyst of Example 13 (containing 25% Fe$_2$O$_3$ on silica) was impregnated in a manner similar to Example 1 with an aqueous solution containing only CuCl$_2$ to deposit 4% CuCl$_2$. This catalyst was tested for the same reaction as shown in Table III under the same conditions and a volume throughput of sweet product of 126 was obtained.

A comparison of Examples 15 and 16 with Examples 1 and 7 shows that coimpregnation of the copper and iron yields catalysts with superior stability for sweetening. Supports other than silica gels have also been used. Again coimpregnation of the Cu and Fe salts leads to the best catalysts.

Example 17

A catalyst was prepared in a manner similar to Example 1 except that alumina rather than silica was the support. The alumina had the following inspections: BET S.A.=217 m.$^2$/g.; pore vol.=0.54 cc./g., and APR=61 A. This catalyst was tested for the same reaction as shown in Table III under the same conditions and a volume throughput of sweet product of more than 954 was obtained.

Example 18

A catalyst was prepared in a manner similar to Example 1 except that no ferric chloride was employed and that alumina rather than silica was used. The alumina was the same as that of Example 17. This catalyst was tested for the same reaction as shown in Table III under the same conditions and a volume throughput of sweet product of 144 was obtained.

Example 19

The catalyst was prepared in two steps: In Step 1, 4.25% CuCl$_2$ was impregnated on the same alumina as in Example 17 in a manner similar to Example 1 except that ferric chloride was omitted; in the Step 2, the 4.25% CuCl$_2$ on Al$_2$O$_3$ catalyst of Step 1 was impregnated with 25% Fe$_2$O$_3$ in a manner similar to Example 1 except that copper chloride was omitted. This catalyst was tested for the same reaction as shown on Table III under the same conditions, and a volume throughput of sweet product of 288 was obtained.

Resort may be had to such variations and modifications as fall within the spirit of the invention and the scope of the appended claims.

We claim:

1. A method of preparing a catalyst which is useful in the conversion of thiols to disulfides which comprises:
   forming a solution of a copper salt and an iron salt selected from the class consisting of the nitrates, sulfates, halides, acetates and nitrites wherein the atomic ratio of copper to iron is from 0.01:1 to 1:1;
   depositing said solution onto an inorganic oxide support having a surface area of at least 50 m.$^2$/g. and comprising at least one metal oxide selected from the group consisting of alumina, silica, thoria and zirconia;
   the amount of said solution being sufficient to deposit on said support from 0.5 to 40 percent by weight of said copper salt and from 5 to 50 percent by weight of said iron salt;
   drying said supported catalyst;
   and calcining said supported catalyst to form CuFe$_2$O$_4$.

2. The method of preparing a catalyst which is useful in the conversion of thiols to disulfides which comprises:
   forming a solution of copper chloride and ferric chloride wherein the atomic ratio of copper to iron is from 0.01:1 to 1:1;
   depositing said solution onto an inorganic oxide support having a surface area of at least 50 m.$^2$/g. and comprising at least one metal oxide selected from the group consisting of alumina, silica, thoria and zirconia;

the amount of said solution being sufficient to deposit on said support from 0.5 to 40 percent by weight of said copper salt and from 5 to 50 percent by weight of said ferric chloride;

drying said supported catalyst; and calcining said supported catalyst to form $CuFe_2O_4$.

3. A method according to claim 2 wherein the support is selected from the group consisting of alumina, silica or mixtures thereof.

4. A method according to claim 3 wherein the solution of copper and iron chlorides is an aqueous solution and is deposited by impregnation using a minimum amount of excess solution.

5. A method according to claim 4 wherein the inorganic oxide support is alumina.

6. A process for the oxidative sweetening of sour hydrocarbons which comprises contacting a sour hydrocarbon under sweetening conditions with a calcined catalytic composite comprising iron, copper and oxygen, said composite resulting from the steps of:

forming a solution of a copper salt and an iron salt wherein the atomic ratio of copper to iron is from 0.01:1 to 1:1;

depositing said solution onto an inorganic oxide support having a surface area of at least 50 m.$^2$/g. and comprising at least on metal oxide selected from the group consisting of alumina, silica thoria and zirconia;

the amount of said solution being sufficient to deposit on said support from 0.5 to 40 percent by weight of said copper salt and from 5 to 50 percent by weight of said iron salt;

drying said supported catalyst; and calcining said supported catalyst.

7. A process according to claim 6 wherein the sour hydrocarbon is contacted with said composite in the added presence of a gas containing free molecular oxygen.

8. A process for the oxidative sweetening of sour hydrocarbons which comprises contacting a sour hydrocarbon under sweetening conditions and in the added presence of a gas containing free molecular oxygen with a calcined catalytic composite comprising iron, copper and oxygen, said composite resulting from the steps of forming a solution of copper chloride and an iron salt wherein the atomic ratio of copper to iron is from 0.01:1 to 1:1;

depositing said solution onto an inorganic oxide support having a surface area of at least 50 m.$^2$/g. and comprising at least one metal oxide selected from the group consisting of alumina, silica, thoria and zirconia;

the amount of said solution being sufficient to deposit on said support from 0.5 to 40 percent by wegiht of said copper chloride and from 5 to 50 percent by weight of said iron salt;

drying said supported catalyst; and calcining said supported catalyst.

9. A process according to claim 8 wherein the sweetening conditions include a temperature from about 0° to about 300° F.; and a pressure from about 0 to about 500 p.s.i.g.

10. A process according to claim 9 wherein said sour hydrocarbon is a distillate boiling from 50° F. to 700° F.

References Cited

UNITED STATES PATENTS

| | | | |
|---|---|---|---|
| 2,750,261 | 6/1956 | Ipatieff et al. | 252—474 |
| 3,113,166 | 12/1963 | Weesner | 252—474 |
| 3,076,858 | 2/1963 | Frevel et al. | 252—474 |
| 3,097,158 | 7/1963 | Gleim | 208—207 |
| 2,418,884 | 4/1947 | Hoover | 208—191 |
| 2,289,924 | 7/1942 | Morrell et al. | 208—191 |
| 2,492,986 | 1/1950 | Hach | 252—466 J |
| 2,846,484 | 8/1958 | Fox | 252—466 J |

DELBERT E. GANTZ, Primary Examiner

G. J. CRASANAKIS, Assistant Examiner

U.S. Cl. X.R.

252—459, 466